United States Patent
De Silva et al.

(10) Patent No.: US 9,577,842 B2
(45) Date of Patent: Feb. 21, 2017

(54) SHARED L2 BRIDGING DOMAINS FOR L3 VIRTUAL NETWORKS

(75) Inventors: Suran Saminda De Silva, Saratoga, CA (US); Chandrashekhar Appanna, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 252 days.

(21) Appl. No.: 12/036,408

(22) Filed: Feb. 25, 2008

(65) Prior Publication Data

US 2009/0213859 A1    Aug. 27, 2009

(51) Int. Cl.
| | | |
|---|---|---|
| H04L 12/28 | (2006.01) | |
| H04L 12/46 | (2006.01) | |
| H04L 12/701 | (2013.01) | |
| H04L 12/781 | (2013.01) | |

(52) U.S. Cl.
CPC ....... H04L 12/4641 (2013.01); H04L 12/4625 (2013.01); H04L 45/00 (2013.01); H04L 45/52 (2013.01)

(58) Field of Classification Search
None
See application file for complete search history.

(56) References Cited

U.S. PATENT DOCUMENTS

| | | | | |
|---|---|---|---|---|
| 6,781,989 B1* | 8/2004 | Acharya | ................. | 370/392 |
| 7,123,620 B1* | 10/2006 | Ma | .................... | 370/395.32 |
| 7,908,395 B1* | 3/2011 | Salkewicz | ......... | H04L 12/24 370/401 |
| 7,936,770 B1* | 5/2011 | Frattura et al. | ............. | 370/412 |
| 2003/0026271 A1* | 2/2003 | Erb et al. | ................ | 370/401 |
| 2003/0210651 A1* | 11/2003 | Tzeng et al. | ............. | 370/231 |
| 2004/0114578 A1* | 6/2004 | Soncodi et al. | ........... | 370/352 |
| 2004/0151290 A1* | 8/2004 | Magarasevic et al. | .... | 379/93.05 |
| 2004/0208153 A1* | 10/2004 | Mizell et al. | .............. | 370/338 |
| 2004/0240446 A1* | 12/2004 | Compton | ................ | 370/389 |
| 2006/0048206 A1* | 3/2006 | Fdida et al. | .............. | 725/135 |
| 2006/0193266 A1* | 8/2006 | Siddha et al. | ............. | 370/254 |
| 2007/0058638 A1* | 3/2007 | Guichard | ........... | H04L 12/4641 370/395.31 |
| 2007/0165530 A1* | 7/2007 | Dong | ..................... | 370/235 |
| 2007/0266178 A1* | 11/2007 | Wong | ................. | H04L 49/90 709/246 |
| 2007/0280243 A1* | 12/2007 | Wray et al. | ................. | 370/392 |

* cited by examiner

*Primary Examiner* — Steve Young
(74) *Attorney, Agent, or Firm* — Meunjer Carlin & Curfman LLC

(57) ABSTRACT

Systems and/or methods that facilitate the segmentation of layer 3 (L3) data to more than one virtual private network (VPN) or virtual network (vNET) are presented. An application classifier component can be used to facilitate the classification of L2 to and from hosts and/or other networking components that are attached to a network based on the type of application with which the network traffic is associated. The innovation associates multiple Virtual Local Area Networks (VLANs) with the same L2 forwarding table ahead of bridging into shadow VLANs (SVLANs) which can be associated with different L3 vNETs. The application classifier component can classify data traffic at the switch port through Switching Virtual Interfaces (SVIs) into SVLANs which can be associated with different L3 vNETs. Each vNET can be optimized and provide services specific to which type of application in which the vNET is associated.

18 Claims, 9 Drawing Sheets

SHARED L2 BRIDGING DOMAINS FOR L3 VIRTUAL NETWORKS

BACKGROUND

Today, virtually all networks are based on the Open Systems Interconnections (OSI) standard that is typically abstractly described in seven layers (e.g., the OSI Reference Model) wherein the seven layers define the different states that data passes through to travel from one host (personal computer (PC), laptop, server etc.) to another host over a network. The top three layers (e.g., application layer, presentation layer, and session layer) comprise the "application set" layers, while the bottom four layers (e.g., transport layer, network layer, data layer, and physical layer) comprise the "transport set." Control of the data that is sent from a first host to a second host is passed from one OSI layer to the next. For example, the data is passed from a first host starting at the top OSI layer (e.g., application layer) to the bottom layer (e.g., the physical layer), passes through the networking channel, where control is passed from the bottom layer to the top layer to a second host.

The first two layers (e.g., physical layer and data layer) are required for every type of communications. Layer 2 (L2) (e.g., data layer) is responsible for ensuring the validity and integrity of data transmissions and for dividing the data into frames (e.g., Ethernet frame, Token Ring frame) in local area networks (LANs). If all the hosts associated with an L2 network are within a single network segment, then routing capability in the L2 is not required.

The third layer (e.g., networking layer) can route data between hosts and can extend the node-to-node function of L2 networking, because layer 3 (L3) utilizes routable protocols (e.g., transmission control protocol (TCP), user datagram protocol (UDP), etc.) that utilize a network address (e.g., an internet protocol (IP) address) to facilitate routing data from one host to another host. When receiving packets (e.g., TPC packets, UDP packets etc.), the L3 protocol can prepare the packets for the L2 protocol by turning the IP addresses into the media access control (MAC) physical host addresses (e.g., the physical address) and can fragment the packets, if necessary, into a required frame size for the L2 network.

Virtual networks (vNETs) enable concurrent sharing of physical resources among multiple applications and can provide isolation among virtual entities. For example, vNETs can be constructed by linking nodes within a network with tunnels that can encapsulate packets within the vNETs with the addition of headers. The vNETs also provide the ability to bypass nodes that are not part of a particular vNET.

Traditionally, all of the L2 traffic from a particular host is associated with one L3 router. For example, if an ARP (Address Resolution Protocol) packet from a host to an L2 switch is associated with a particular VLAN (virtual local area network), the L2 switch can bridge the ARP packet if the packet is to stay within that particular VLAN. However, if the packet is classified as a routable packet, the L2 switch can route the packet to a particular L3 network or vNET that can be associated with the host.

The segmentation of data traffic is provided at the L2 level while aggregation of data traffic is typically performed at the L3 level. Conventionally, L3 virtual networks, such as virtual private networks (VPNs), integrate with regular bridging. VLANs or bridging domains are usually represented as a subnet to the L3 layer. However, when integrating bridging domains with L3 vNETs where classification into L3 vNETs is required, it is not clear how to extend that L3 vNET segmentation down to the L2 VLANs.

DESCRIPTION

Overview

Figure 1:
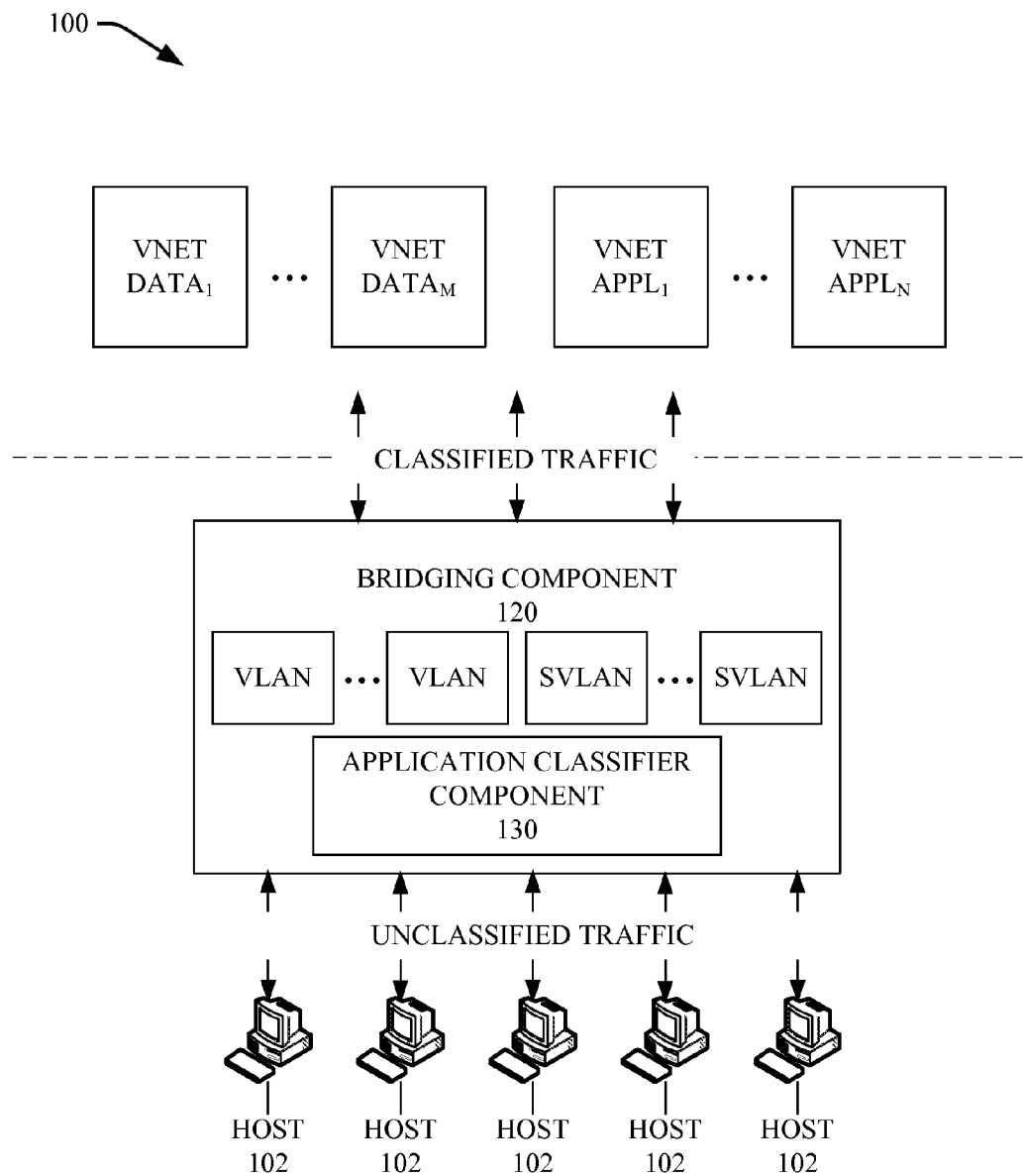
FIG. 1 illustrates an example bridging component that facilitates classifying and directing traffic (e.g., data) in accordance with an aspect of the specification.

The following presents a simplified overview of the specification in order to provide a basic understanding of some aspects of the technology. This overview is not an extensive overview of the subject disclosure. It is not intended to identify key/critical elements of the subject disclosure or to delineate the scope of the technology. Its sole purpose is to present some concepts of the technology in a simplified form as a prelude to the more detailed description that is presented later.

The subject specification relates generally to directing layer 2 (L2) data and in particular, to systems and/or methodologies that can facilitate the segmentation of L2 data to more than one virtual private network (VPN) or virtual network (vNET). The technology disclosed herein, in one embodiment thereof, comprises an application classifier component within an L2 bridging component that allows for a shared L2 domain while performing segmentation of L3 data of each host located within a network without any requirements of re-subnetting the host or moving the host to another bridge network or VLAN. It is to be appreciated that the disclosed subject matter contemplates that the classifier component can be implemented within a network that is associated with multiple VLANs or within a network that is associated with a single VLAN (e.g., within a physical router port). It is to be further appreciated that some form of L3 network virtualization may be required; however, the application classifier component can provide a mechanism for classifying data associated with hosts within an L2

VLAN into multiple L3 vNETs and/or VPNs. Conventionally, all of the L2 traffic (e.g., data) from a host is associated with one L3 router. However, service/content providers and end-users may desire different behaviors from different types of information from a particular host e.g., it is often desirable to isolate the data (e.g., based on the type of application) from each other based upon the type of application with which the data is associated. By segmenting the different data/information from a single host to different L3 networks (e.g., based on the type of application with which the application is associated), different types of features and/or services for different applications can be provided for different types of application data from the same host.

The subject systems (and corresponding methodologies) allow for a shared L2 domain while performing segmentation of traffic at the L3 level via a flexible classification of different types of traffic for a host into application-based L3 virtual networks (vNETs) at a switch port. The classification can be performed without any disruptions to the conventional L2 functionally, and each host can continue to send/receive data without the need to obtain a different internet protocol (IP) address. For example, generic data traffic such as dynamic host configure protocol (DHCP) and address resolution protocol (ARP) can be handled by L2 level bridging in a conventional manner. In accordance with one aspect of the specification, the L2 bridging system can associate multiple VLANs with the same L2 forwarding table. Further, the L2 bridging system can classify data traffic at the switch port shadow VLANs (SVLANs) which can be associated with different L3 virtual networks (vNETs). The system can associate multiple VLANs with the same L2 forwarding table ahead of bridging into SVLANs which are associated with different L3 vNETs.

In one embodiment, each access switch port of an L2 VLAN can belong to a "native" L2 VLAN within a network, which can have a corresponding Switched Virtual Interface (SVI) for connecting to an L3 router, for example. Further, "internal" VLANs can be allocated within the network to create one or more SVLANs. The SVLANs can share the same L2 forwarding lookup table as the native VLANs. For example, one can introduce a voice VLAN for voice applications (e.g., "voice VLAN"). The application classifier component can direct the voice VLAN traffic by classifying the user datagram protocol (UDP) traffic of the designated UDP port range into the supplementary voice VLAN that maps to a voice vNET.

In accordance with one aspect of the specification, L3 virtualization can be provided by associating the native VLANs and SVLANs with different SVIs. For example, each SVI can belong to a separate L3 vNET. The ability to have IP address overlap across L3 vNETs can also be preserved. The separate SVIs can allow hosts, for example, to benefit from the L3 network virtualization for different types of data traffic without requiring the host(s) to have multiple internet protocol (IP) addresses. The address resolution protocol (ARPs) can occur on the native VLAN and can populate the Forwarding Information Base (FIB) of the vNETs of the native VLAN SVIs. The L2/L3 switch can additionally cross-populate the FIB of the vNETs of the SVIs as well.

To the accomplishment of the foregoing and related ends, certain illustrative aspects are described herein in connection with the following description and the annexed drawings. These aspects are indicative, however, of but a few of the various ways in which the principles of the technology can be employed and the subject specification is intended to include all such aspects and their equivalents. Other advantages and features of the technology will become apparent from the following detailed description when considered in conjunction with the drawings.

Description of Example Embodiments

The system (and corresponding methodology) is now described with reference to the drawings, wherein like reference numerals are used to refer to like elements throughout. In the following description, for purposes of explanation, numerous specific details are set forth in order to provide a thorough understanding of the specification. It may be evident, however, that the system can be practiced without these specific details. In other instances, well-known structures and devices are shown in block diagram form in order to facilitate description of example embodiments.

This specification discloses the ability of a computer network to provide shared layer 2 (L2) domains while performing segmentation of individual host layer 3 (L3) data at the L2 level. By performing host L3 data segmentation at the L2 level, individual host data can be routed to different virtual networks (vNETs) that can provide, for example, specialized services based on the type of data. This specification details a system and methodology that accommodates the classification and direction of the data from each host that is a member of a computer network based on the type of application the data is associated.

The specification further provides the ability to accommodate the classification of traffic (e.g., data) from a host on an L2 VLAN into any number of L3 virtual private networks (VPNs) and/or vNETs without requiring the host to have multiple IP addresses or requiring the host to be moved to a different subnet. In addition, the specification further provides the ability to accommodate the classification of traffic (e.g., data) from a host on an L2 VLAN into any number of L3 VPNs and/or vNETs without requiring the host to run 802.1q. Further, the system provides for the L2 segmentation of L3 traffic to be provided with minimal (or without) disruption to existing L2 control protocols.

Service/content providers often desire the ability to provide application-based VPNs or vNETs to allow for some applications that have different network requirements than other applications to be handled by path-isolation segmentation based on the type of application. The aforementioned features, functions and benefits will be better understood upon a review of the figures that follow.

Referring to the drawings, FIG. 1 illustrates a system 100 that facilitates classifying and directing traffic (e.g., data) in a computer network in accordance with the specification. The system 100 receives unclassified traffic, classifies the traffic based on the type of application with which the traffic/data is associated, and directs the traffic to a vNET based on the type of application the data is associated. In doing so, the data is segmented at L2 and aggregated at the L3 thereby enabling the simultaneous transmission to multiple vNETs.

System 100 can include a plurality of host(s) 102 (e.g., computers and/or other computer-related equipment) wherein each host 102 can be connected to a bridging component 120. The host(s) 102 can, for example, be located within the same segment or different segments of a network. Further, one or more of the host(s) 102 can be a member of one or more VLANS and/or vNETs associated with the bridging component 120.

The bridging component 120 can provide a shared L2 domain for the host(s) 102 associated with a computer network and can receive unclassified traffic from the host(s) 102. The bridging component 120 can include an application classifier component 130 that can classify or categorize the unclassified traffic received from the host(s) 102. The application classifier component 130 can classify the traffic based on the type of application with which the data is associated, wherein the application classifier component 130 can classify traffic associated with a single VLAN (e.g., a physical router port wherein no bridging is required) or multiple VLANs. The bridging component 120 can facilitate forwarding the classified data from the application classifier component 130 to an L2 or L3 level within the network that the bridging component 120 can be associated.

System 100 provides the ability of the bridging component 120 to share L2 domains with the host(s) while the application classifier component 130 provides the segmentation of individual host 102 L3 traffic at the L2 level of the network. Individual host 102 traffic can be routed or bridged to different or multiple virtual local area networks (VLANs) and/or virtual networks (vNETs) that can provide, for example, specialized services based on the type of application that the traffic is associated.

In accordance with one aspect of the disclosed subject matter, one more VLANs (e.g., depicted in FIG. 1 as "VLAN") associated with the bridging component 120 can be access VLANs that can allow for user-based segmentation (e.g., as is currently being performed by L2 bridges). The bridging component 120 can employ the application classifier component 130 to segment the L2 data traffic prior to bridging to a SVLAN (e.g., depicted in FIG. 1 as "SVLAN") that can be associated with an application-specific virtual networks (vNETs) (e.g., depicted as vNET DATA$_1$ through VNET DATA$_m$ and VNET APPL$_1$ through vNET APPL$_n$ in FIG. 1). It is to be appreciated that routing tables (not shown) within the bridging component 120 can have different destination address (L3 virtual networks) for packets/frames coming from the same host depending upon the application to which the packets/frames are associated.

Figure 2:
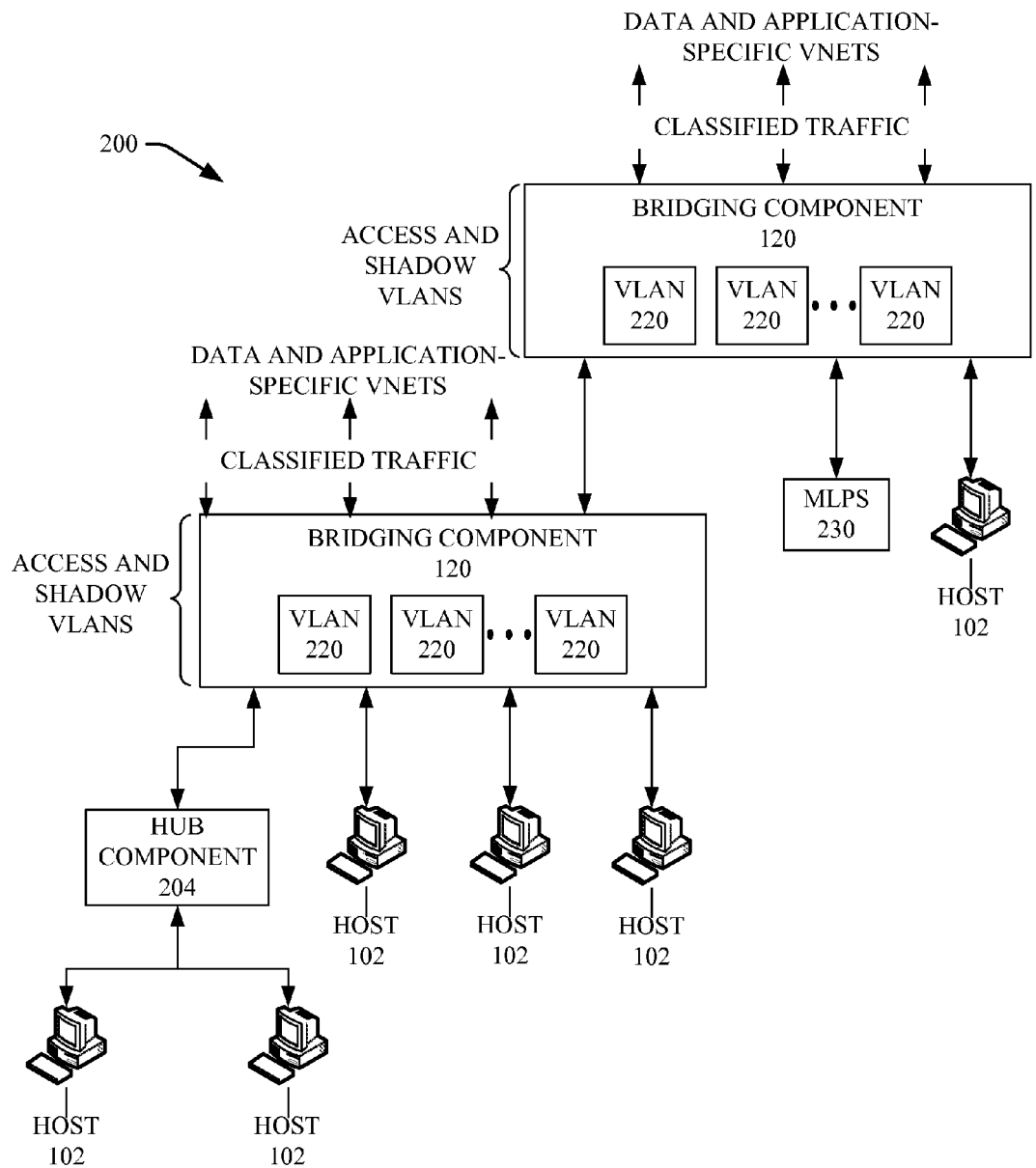
FIG. 2 illustrates an example block diagram of an example network environment that facilitates classifying data based on the type of application with which the data is associated in accordance with an aspect of the specification.

Referring to the drawings, FIG. 2 illustrates an example system 200 wherein the specification can be implemented. System 200 illustrates a networking system that can include a plurality of host(s) 102 that can connect through various types of network devices. For example, system 200 may include such components as a hub component(s) 204 and/or bridging component(s) 120. In accordance with one aspect of the specification, the hosts 102 can be located at different geographical locations and can be connected to bridging component(s) 120 through a virtual local area network (VLAN), Multi-Protocol Label Switching (MPLS), and/or other types of networks. An MPLS, for example, can operate on the L2 or L3 layer of the Open System International (OSI)

It is to be appreciated that the bridging component 120 can include the same or similar components (e.g., application classifier complement 130) as described herein in system 100. Each of the bridging component(s) 120 within system 200 can receive unclassified data from the plurality of components/devices (e.g., host(s) 102, hub component(s) 204, and/or other bridging component(s) 120) located within network 200. The respective bridging component(s) 120 and associated application classifier component(s) 130 (not shown) can classify and categorize the unclassified traffic based on the type of L3 application the data is associated. For example, the one or more VLAN(s) 220 associated with the bridging component 120 can be access VLANs that can allow for user-based segmentation, and the bridging component 120 can employ the application classifier component (not shown) to facilitate the segmentation of the L2 data traffic prior to bridging to one or more data and application-specific vNETs.

In system 200, data can be transferred from one host 102 to another host 102 through one or more levels of hardware and/or software layers. The hardware and software layers can be classified into a network interface layer, an inter-network layer, a transport layer, and an application layer within the OSI model, for example. By way of further example, the network interface layer can include a physical layer and a data-link layer wherein the physical layer can relate to the electrical and mechanical connections between each host 102. Further, the data-link layer can be represented by the bridging component(s) 120 and can control data transfers across the physical layer(s) within an OSI model, for example.

In accordance with one aspect of the specification, the data-link layer can define the L2 resources to control the access to the various network components (e.g., host(s) 102, bridging component(s) 120, and/or hub component(s) 204, for example). The L2 resources can be, for example, Media Access Control (MAC) addresses for a plurality of devices connected to the network, a VLAN identifier, a MAC address and VLAN identifier pair (e.g., matching of specific MAC address to VLAN routing internet protocol (IP) numbers), a Virtual Circuit Identifier (VCID), and/or an MPLS tag, for example. The MAC address can represent a unique hardware address for each host 102 or other component located within a network. For example, each host 102, hub component 204, and bridging component 120 can have a unique MAC address. The data transferred within the network can be transferred based upon source and destination MAC addresses associated with the data, for example. In accordance with one aspect, the MAC address/VLAN identifier pair can associate a specific unique MAC address to one of the VLANs 220 within system 200. It is to be appreciated that an MPLS tag, for example, can be used for routing packets of information that are associated with routing protocols that utilize MLPS such as, for example, MLPS 230. It is to be further appreciated that packets/data can be routed and/or bridged based on the VCID associated with the packet/data.

In various embodiments, the computer network 200 can be a distributed network of bridges such as the Catalyst 6000-brand (Cat6k) series switching system, manufactured by Cisco Systems Inc., for example. In one embodiment, a Cat6k series switching system can be an Enhanced Address Recognition Logic (EARL) module-enabled system. For example, an EARL module can reside in each Distributed Forwarding Card (DFC) line card within the Cat6k series switching system. The EARL modules can be EARL 5, EARL 6, EARL 7 or EARL 8, for example. Example L2 resources specific to the EARL module can be, for example, a Bridge Domain (BD), Logical Interface (LIF), and/or a specific port-channel index. An L2 bridge (e.g., bridging component 120) can facilitate mapping multiple VLANs to the same frame identifier (FID) for the shared L2 forwarding table within an L2 bridge for bridges utilizing EARL 7 components. In accordance with another aspect, an L2 bridge can facilitate the mapping of multiple VLANs for packets of data to the same BD for the shared L2 forwarding table within an L2 switch that utilizes EARL 8 components.

In accordance with one aspect, when data traffic is incoming on a switch port, a Port-Based Access Control List (PACL) or other port-based classification can mark the packet off the native VLAN and onto an SVLAN (e.g., to an SVLAN associated with the type of application with which the data is associated). In Cat6k switching systems for example, the switching can be done within the EARL via an EARL recirculation.

Figure 3:
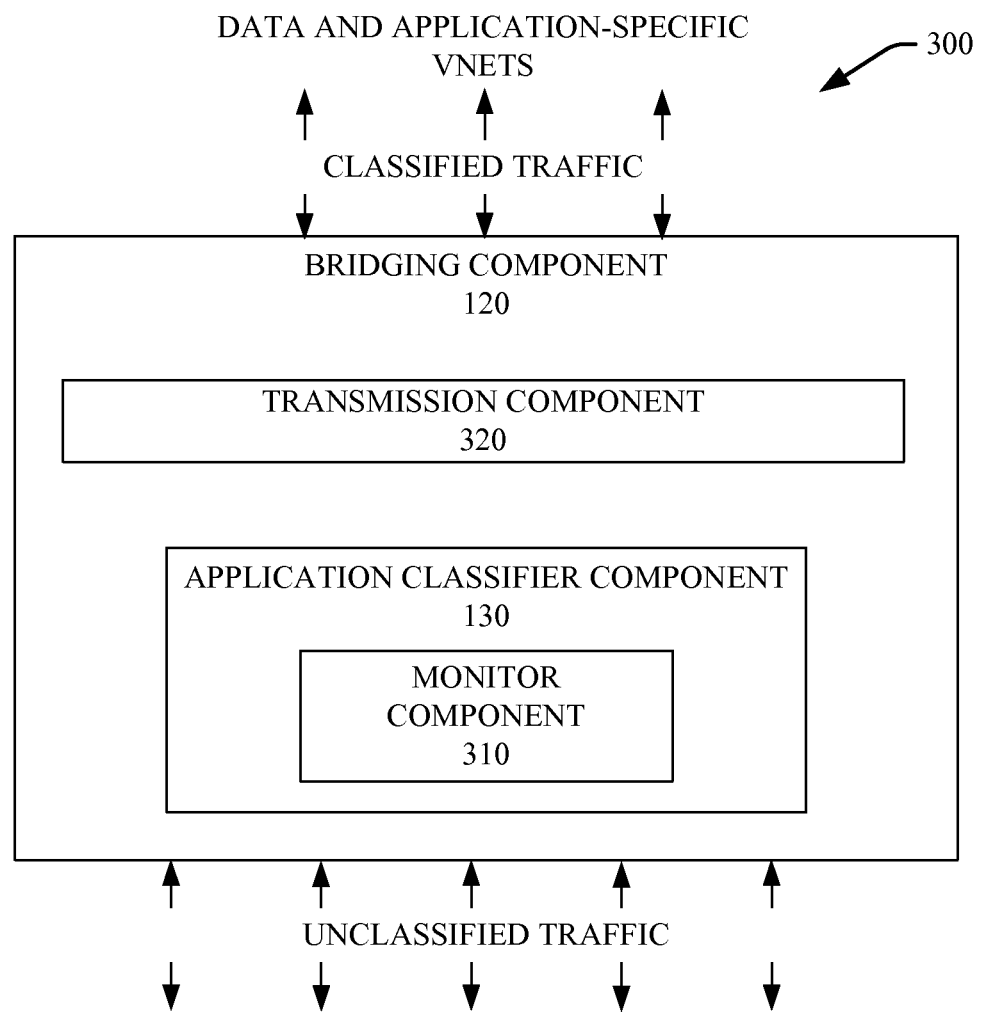
FIG. 3 depicts an example block diagram of an apparatus that directs data into data and application-specific vNETs based on the type of application associated with the data.

Turning now to FIG. 3 an illustration is shown of an example system 300 that facilitates application-specific classification of data traffic. System 300 can include a bridging component 120 that can provide a shared L2 domain while performing segmentation of an individual host's (not shown) L3 traffic through the classification of traffic from the individual host on an L2 VLAN into virtually any number of L3 vNETs without requiring the host to run 802.1q and without requiring the host to having multiple IP addresses. The connection to the L3 virtualization can be provided by associating the native VLANs and SVLANs with different switched virtual interfaces (SVIs), where each SVI is associated with separate L3 VPNs or vNETs. With the ability to have address overlap across L3 VPNs or vNETs, a host can benefit from L3 network virtualization for different types of traffic without being required to have multiple IP addresses.

The bridging component 120 can include an application classifier component 130 that provides the mechanism for classifying traffic from a given host on an L2 VLAN into multiple L3 vNETs. The bridging component 120 can also include monitor component 310 and a transmission component 320. While the sub-components (130, 310, 320) are illustrated inclusive of a bridging component 120, it is to be understood and appreciated that these components can be remotely located without departing from the spirit and scope of the specification. Still further, it is to be understood that, in alternative aspects, all of a subset of the described functionality of the sub-components (130, 310, 320) can incorporated into a single component (not shown) as appropriate or desired.

The bridging component 120 can facilitate connecting to various types of interfaces and different types of networks such as, for example Ethernet, fiber optic, cable, and/or 801.11 (e.g., wireless). It is to be appreciated that the bridging component 120 can operate at one or more layers within the Open Systems International (OSI) model. For example, the bridging component 120 can operate at L1 (e.g., physical layer), L2 (e.g., data-link layer), L3 (e.g., network layer), L4 (e.g., transport layer), or any combination thereof. It is to be further appreciated that the bridging component 120 can also include such services as network intrusion detection, performance analysis functions, firewall protections, and/or other various network functions associated with switching and/or routing data within a network.

In one embodiment, the bridging component 120 can store the media access control (MAC) addresses of all the network devices associated with bridging component 120 in a content addressable memory (CAM), for example. Additionally, the bridging component 120, for example, can also store the internet protocol (IP) address of the network devices associated with the network in a CAM and/or ternary CAM (TCAM). As shown, the bridging component 120 can facilitate receiving packets/frames of unclassified traffic/data from a plurality of network devices and forwarding the packets/frames that are classified (e.g., classified traffic) based on the type of application the packets/frames are associated. In accordance with one aspect, the bridging component 120 can direct a packet of information specifically to a network device or VLAN, for example, to which the packet is addressed. For example, hosts (e.g., 102 of FIG. 1) on the same native VLAN can be members of an application-specific L3 vNET. The bridging component 120 can classify traffic from the hosts into supplementary application VLANs associated to the native VLAN and direct the traffic on the supplementary application VLANs into the application-specific L3 vNETs. Hosts on the same application-specific L3 vNET can communicate with each other using the allowed traffic for that application-specific L3 vNET.

The application classifier component 130 can facilitate classifying application-specific traffic/data (e.g., L2 traffic) that the bridging component 120 receives from hosts (e.g., 102 of FIG. 1) and/or other networking components (e.g., collectively referred to as "network components") based on the type of application(s) associated with the data traffic the network components are running. Conventionally, all L2 traffic placed onto a VLAN is placed onto the same subnet. These subnets are conventionally used for user-based segmentation. In accordance with one aspect of the specification, the application classifier component 130 can classify routing traffic for different applications that can be routed into different shadow VLANs (SVLANs). The application classifier component 130 can classify all L3 traffic based on the type of application that is being transmitted from a network component.

In accordance with another aspect, the application classifier component 130 can facilitate routing traffic (e.g., L3 traffic) for different applications into data and application-specific vNETs that can be associated with an L2 virtual network. It is to be appreciated that the routing of the application-specific vNETs can be performed without any requirement of a host (not shown) to change its internet protocol (IP) address. Essentially, the application classifier component 130 can classify all L3 traffic (e.g., routed traffic) according to the particular application with which the data is associated (e.g., wherein the data can be routed to application-specific vNETs). The associated VLANs and SVLANS can use (e.g., map to) the same L2 lookup table. Further, the media access control (MAC) addresses learned on the VLANs can be learned on the SVLANs as well.

The monitor component 310 can facilitate monitoring the resources available to bridging component 120. In accordance with an embodiment, the monitor component 310 can facilitate tracking network devices such as, for example host(s) (e.g., 102 of FIG. 1), MLPS(s) (e.g., 230 of FIG. 2), and/or hub component(s) (e.g., 204 of FIG. 2) associated with the network. In one embodiment, the monitor component 310 can interrogate the various hardware components of the network in a manner that informs the monitor component 310 about any changes to the network hierarchy associated with the bridging component 120 e.g., such as if a network device (e.g., host, hub component etc.) is added or removed from the network associated with the bridging component 120.

The monitor component 310 can facilitate polling of the network devices associated with the bridging component 120. For example, the monitor component 310 can poll each network device on the network at regular (or otherwise defined/preferred) intervals to ascertain changes in the network hierarchy. For example, a simple network management protocol (SNMP) can be used to perform such a polling routine. In accordance with one aspect, the monitor component 310 can work in conjunction with a routing processor (RP) and/or a switching processor (SW) to monitor the network devices associated with the network. It is to be appreciated that that the monitor component 310 can be implemented in hardware and/or software. It is also to be appreciated that the monitor component 310 can reside within the application classifier component 130 hardware/software apparatus, or the monitor component 310 can be a stand-alone hardware/software component.

The transmission component 320 can facilitate directing the data the application classifier component classified according to the type of application with which the data is associated. The transmission component 320 can receive packets of data from the application classifier component 130 and direct it to a specific vNET or VLAN with which the data is associated. In one embodiment, the application classifier 130 can determine that unclassified data can be associated with a voice application and classify the data as voice data, for example. The transmission component 320 can transmit or direct the traffic that the application classifier component 130 classified as voice data to a VLAN or vNET that can be designated to provide specialized services for the voice data, for example.

Figure 4:
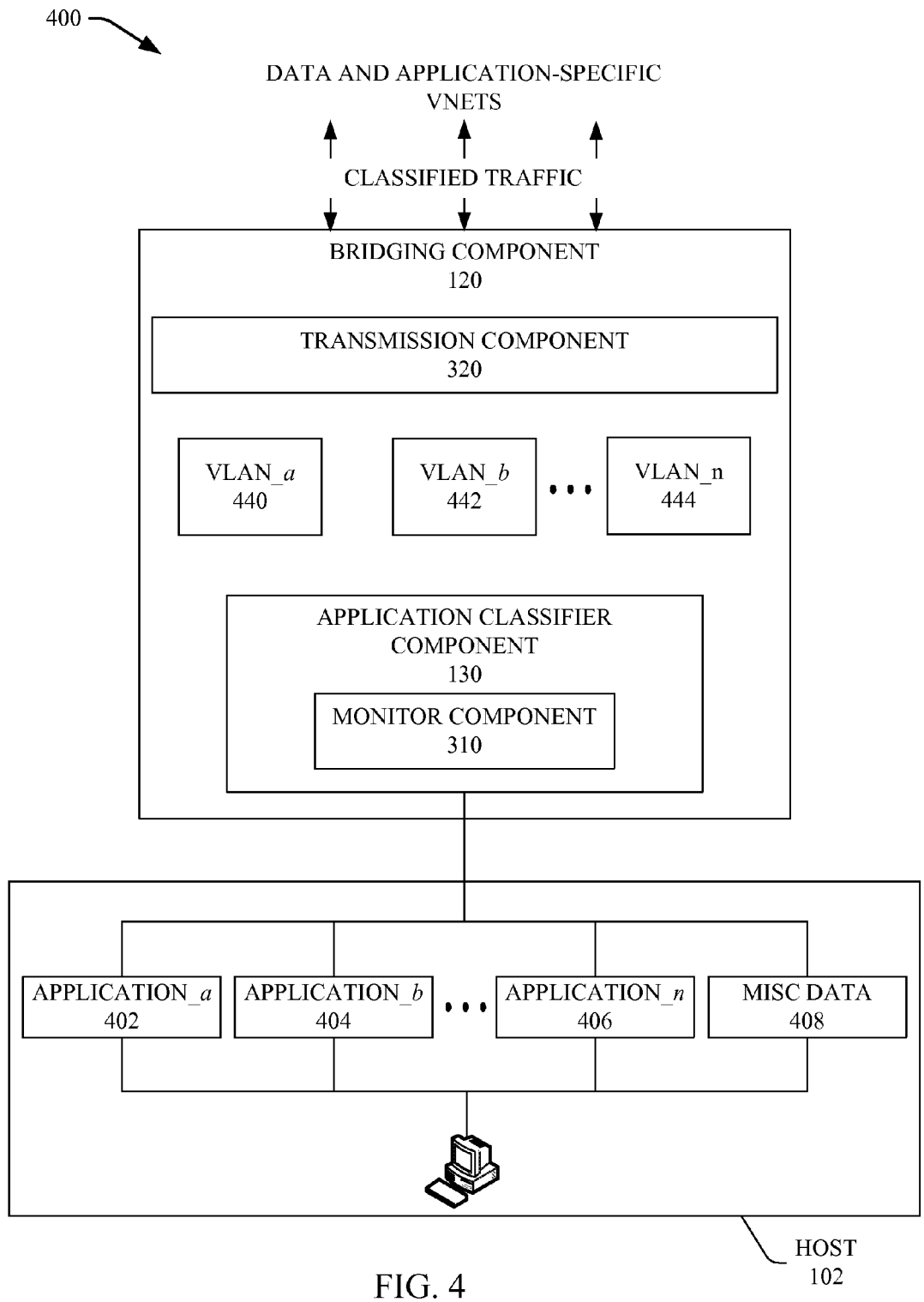
FIG. 4 illustrates an example routing network wherein the described bridging domains can be practiced in accordance with an aspect of the specification.

With reference now to FIG. 4, an illustration of an example system 400 is shown that facilitates directing data into different VLANs based on the type of application in accordance with the specification. For brevity, only one host 102 and one bridging component 120 are depicted in FIG. 4; however, it is to be appreciated that most any number of host(s) 102 and bridging component(s) 120 can be employed within system 400 in accordance with other embodiments. It is further to be appreciated that the host 102 and bridging component 120 can each include their respective functionality as more fully described herein, for example, with regard to system 100 and system 200. It is also to be appreciated that bridging and routing functions can be combined within a single bridging component (e.g., 120) or they can be split into two or more bridging and/or routing components, for example.

System 400 can be comprised of at least one host 102 wherein each host 102 can send and receive data associated with applications application_a 402, application_b 404 through application_n 406, where n is an integer (hereinafter collectively referred to as "applications 402 through 406"). The applications 402 through 406 can be most any type of application (e.g., video, file transfer protocol (FTP), voice, audio, peer-to-peer etc.). In one aspect, the host 102 can also send and receive general data from misc data 408 that can be associated with conventional bridging level protocols such as Dynamic Host Configure Protocol (DHCP) and Address Resolution Protocol (ARP), for example.

System 400 can include VLAN_a 440, VLAN_b 442 through VLAN_n 444, where n is an integer (hereinafter collectively referred to as "VLAN 440 through VLAN 444"). It is to be appreciated that additional VLANs can be added depending on network requirements or other factors as appropriate. A VLAN such as, for example, VLAN 440 through VLAN 444 can be viewed as a grouping of one or more host(s) 102 that can have a common set of requirements or applications. It is to be appreciated that various host(s) 102 connected to a VLAN can be geographically disperse, e.g., host(s) 102 associated with a VLAN, need not be physically connected to the same bridging component 120. One benefit of utilizing a VLAN is that it can provide the ability of host(s) 102 belonging to a specific VLAN to communicate with other host(s) 102 as if each host is connected to the same data connections (e.g., Ethernet, fiber optic, etc.), for example. For example, a host(s) 102 that is a member of VLAN_a 440 can communicate with other VLAN_a 440 members (e.g., other host(s) 102) as if they are physically connected to the same bridging component 120. The VLANs provide the flexibility of reconfiguring a network through software instead of physically relocating individual network components (e.g., host(s) 102).

System 400 can also include an application classifier component 130 that can categorize or classify packets (e.g., data configured into packets) received from host 102 whereby the traffic can be simultaneously directed to multiple vNETs based on the type of application the traffic is associated. For example, the application classifier component 130 can classify packets of data according to which VLAN a packet is associated. In accordance with one aspect of the disclosed subject matter, VLAN_a 440 can be a VLAN designated for packets of data associated with video applications while VLAN_b 442 can be designated for packets of data associated with audio applications, for example. In accordance with one aspect of the disclosed subject matter, the application classifier component 130 can facilitate classifying traffic to/from host 102 based on, for example, whether the packet is associated with a video or an audio application. For example, the application classifier component 130 can direct video traffic to the VLAN_a 440 and direct audio traffic to VLAN_b 442.

In accordance with one aspect, the host 102 can attach a "tag" to the packet of data to indicate which type of application the data is associated. For example, the host 102 can attach a "video tag" for packets of data associated with video traffic and the host 102 can attach an "audio tag" for packets of data associated with audio traffic. In accordance with one aspect of the specification, the application classifier component 130 can then classify the packets of data based on whether a particular packet has an audio tag or a video tag associated with the packet. For example, if the application classifier component 130 receives a packet of data with a video tag, it can call a switching function that classifies the data as video and can facilitate forwarding the packet to VLAN_a 440. If, for example, the application classifier component 130 receives a packet of data with an audio tag from the host 102, it can invoke a switching function to classify the packet as being associated with an audio application and facilitate forwarding the packet to VLAN_b 442. While a specific 'tagging' scheme is described above, it is to be understood that most any suitable mechanism of identifying traffic type can be employed in accordance with the specification. These alternative aspects are to be included within the scope of this specification and claims appended hereto.

Figure 5:
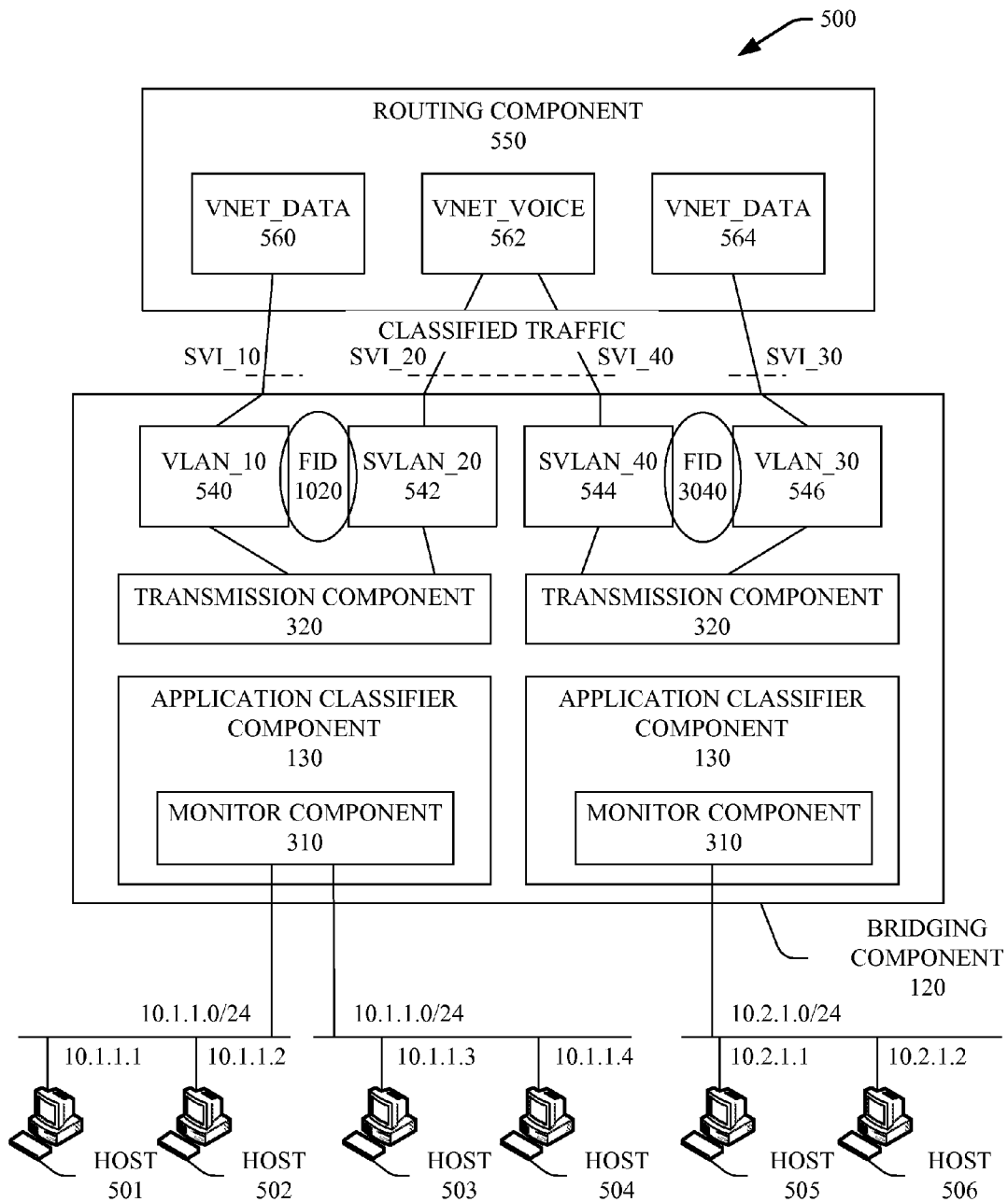
FIG. 5 illustrates an example routing network that facilitates classifying and directing data based on the type of application to which the data is associated in accordance with an aspect of the specification.

Turning to FIG. 5, an illustration of an example system 500 is shown that facilitates classifying and directing data based on the type of application to which the data is associated. System 500 can be comprised of host 501, host 502, host 503, host 504, host 505, and host 506 (hereinafter collectively referred to as "hosts 501 through 506"). It is to be appreciated that the hosts 501 through 506 can each include their respective functionality as host 102 as more fully described herein, for example, with regard to system 100, system 200, and system 400.

A monitor component 310 can store the media access control (MAC) addresses of the host(s) 102 and routing component(s) 550 associated with the network. It is to be appreciated that the host(s) 102 need not be 802.1q capable and the routing component 550 MAC address can be the same for access to VLANs and SVLANs. It is to be further appreciated that the processes of the monitor component 310 can be performed in either hardware or software and can have the same or substantially same functionality as described in system 300 and system 400.

System 500 can also include an application classifier component 130 that can facilitate directing traffic from each hosts' 501 through 506 application to a specific VLAN or SVLAN. The host 102 traffic from applications (e.g., applications 402 through 406 depicted in system 400, for example) and general data (e.g., misc data 408 depicted in system 400, for example) can be classified via the application classifier component 130 which can be contained within a bridging component 120. In accordance with one aspect of the specification, the application classifier component 130 can call switching routines that can facilitate categorizing and directing traffic associated with host 102 based on which applications the traffic is associated.

The transmission component 320 can facilitate the directing of data traffic that the application classifier component classified into associated (S)VLANs VLAN_10 540, SVLAN_20 542, SVLAN_40 544, and VLAN_30 546 (hereinafter collectively referred to as "(S)VLANs 540 through 546"). The (S)VLANs 540 through 546 can be associated with one or more bridging component 120, and the subject disclosure contemplates most any number of VLANs and/or SVLANS associated with a network depending upon various network requirements. The transmission component 320, in conjunction with the application classifier component 130, for example, can facilitate directing traffic from a particular host 102 to (S)VLANs 540 through 546 without any re-subnetting or moving a host (e.g., hosts 501 through 506) to another bridge network.

System 500 can also include one or more Switched Virtual Interfaces (SVIs). For brevity, only four SVIs (e.g., SVI_10, SVI_20, SVI_30, and SVI_40) are depicted in system 400. SVIs can be switch ports represented by one interface to a router component (e.g., 550) or switch component. The SVIs can provide layer 3 (L3) processing for packets from all switch ports associated with a particular (S)VLAN, for example. In one aspect, L3 virtualization can be provided by associating the VLANs and SVLANs to a separate L3 vNET or VPN through the respective SVIs.

In accordance with one aspect of the specification, each access switch port of the bridging component 120 can belong to a "native" L2 VLAN, and each native L2 VLAN can have a corresponding SVI for connecting to the routing component 550. For example, as illustrated in system 500, for illustrative purposes, SVI_10, SVI_20, SVI_30, and SVI_40 represent corresponding SVIs for the respective (S)VLANs 540 through 546. Further, "internal" VLANS can be allocated as a type of SVLAN, as depicted in system 500 as SVLAN_20 542 and SVLAN_40 544. For example, VLAN_10 540 can share the same bridging table (e.g., L2 lookup table) as the SVLAN_20 542 and VLAN_30 546 can share the same bridging table as the SVLAN_40 544.

In one embodiment of the disclosed subject matter, the bridging component 120 can be a Cisco Systems Inc. Catalyst 6000 switch (Cat6k), for example. In this embodiment, where the Cat6k utilizes Enhanced Address Recognition Logic (EARL) 7 (e.g., EARL 7) components, for example, multiple VLANs and SVLANs can map to the same Frame Identifier (FID) for the shared bridging forwarding table. Also, for example, in a Cat6k implementation that utilizes EARL 8 components, multiple VLANs and SVLANs can map to the same Bridging Domain (BD) for the shared bridging forwarding table. In accordance with one aspect of the disclosed subject matter, a port-based classification such as Port-Based Access Control List (PACL) can be used to mark a packet off the native VLAN and place it on to an SVLAN. In another aspect of the disclosed subject matter, this task can be performed using EARL recirculation, for example.

System 500 can also include a routing component 550. The routing component 550 can be, for example, a layer 3 (L3) networking device that interconnects separate logical subnets. In accordance with one aspect of the disclosed subject matter, the routing component 550 can extract the destination of a packet it receives, select (or determine) an optimal or preferred path to that destination, and forward the packet to another device within the chosen path. The routing component 550 can have one or more vNETs associated with data. For illustrative purposes, system 500 depicts three such vNETs (e.g., VNET_DATA 560, VNET_VOICE 562 and VNET_DATA 564); however, it is to be appreciated that the disclosed subject matter contemplates that the routing component 550 can accommodate a plurality of vNETs (e.g., VPNs) within a network.

In accordance with one aspect of the disclosed subject matter, VLAN_10 540 and VLAN_30 546 can be L2 access VLANs that can allow for conventional user-based segmentation. Further, SVLAN_20 542 and SVLAN_40 544 can be SVLANs for L3 application-based segmentation via application vNETs, for example. In one embodiment, VNET_DATA 560 and VNET_DATA 564 can be associated with VLAN_10 540 and VLAN_30 546, respectively. Also, VLAN_10 540 and VLAN_30 546 within system 500 can represent VLANs used for general data (e.g., misc data 408, as described in system 400) from hosts 501 through 506, for example. It is to be appreciated that the general data traffic can come from different segments of an L2 network or the same segment and that the general data can include data such as, for example, data for ARPs and DHCP etc.

In one aspect, the application classifier component 130 can facilitate classifying and the transmitting component 320 can facilitate directing an ARP packet from the host 501 to a switch port within the bridging component 120 that can be associated with that particular VLAN. In one aspect, the application classifier component 130 and transmission component 320 can facilitate bridging the traffic if the traffic is to stay within a "native" VLAN. However, if the packet is classified as a routable packet, the application classifier component 130 can facilitate determining which application with which the data is associated and call a routing function to facilitate sending the packet to a vNET associated with the type of application (e.g., VNET_DATA 560, VNET_VOICE 564 and VNET_DATA 564, for example) based on the classification for that particular packet/frame. The routing tables within the bridging component 120 can have different destination addresses for packets/frames coming from the same host, 501, for example, depending upon the application the packet/frame is associated.

In one embodiment, the different vNETs (560, 562, 564), for example, can be optimized and designated for certain types of data and associated applications. In accordance with one aspect of the specification, one L3 vNET or virtual private network (VPN) can be optimized and dedicated for File Transfer Protocol (FTP) data, one for voice data, while another could be designated for video or peer-to-peer traffic, for example. It is to be appreciated that the destination for different packets/frames may be the same for two sets of information, each of which can be associated with different types of applications. For example, one packet/frame can be associated with a voice application while another packet/frame can be associated with video traffic. The two packets/frames (e.g., voice packet and video packet), for example, can be addressed to the same ultimate destination and can be sent from the same or different hosts. The application classifier component 130 can facilitate directing the type of traffic that is being sent and can determine which L3 vNET the information goes through to get to its destination, e.g., the two packets of information can be addressed to the same ultimate destination and each packet can be directed to different routes to get to that destination based on the type of application with which the data is associated.

In accordance with one aspect of the specification, the application classifier component 130 can facilitate classifying general data traffic (e.g., ARPs and DHCP etc.) from one host to another host on the same segment of a network. For example, in a networking system that uses a Cat6k switch, the application classifier component 130 can classify general data traffic from host 501 (e.g., associated with IP address 10.1.1.1) to host 502 (e.g., associated with IP address 10.1.1.2) and the transmission component 320 can direct the general data using a frame identifier L2 FID 1020 (e.g., for switches that use EARL 7 components, for example). In another aspect, the application classifier component 130 can classify voice traffic from host 501 to host 503 (e.g., associated with IP address 10.1.1.3) and the transmission component 320 can direct the voice traffic using L2 FID 1020 as well. In accordance with another embodiment, the application classifier component 130 can classify L3 traffic and the transmission component 320 can employ an L3 protocol to direct the L3 traffic to a plurality of L3 vNETs (e.g., via using a Forwarding Information Base (FIB), for example). The application classifier component 130 can classify and the transmission component 320 can route general data traffic (e.g., ARPs, DHCP, etc.) from host 501 through SVI_10 to VNET_DATA 560, for example. In another aspect, the application classifier component 130 can classify and the transmission component 320 can route voice traffic from host 506 (e.g., associated with IP address 10.2.1.1), for example, through SVI_40 to the VNET_VOICE 562.

In one aspect, a host (e.g., one of the hosts 501 through 506) can attach a "tag" to a packet which in turn can be passed to a routing function to classify the packet. The tag can be based on the type of application the packet/frame is associated. As an example, VNET_VOICE 562 can be designated as a vNET for voice applications. It is to be appreciated that an L3 vNET such as, for example, VNET_VOICE 562 may be optimized and/or provide related services for a particular application, for example. The application classifier component 130 can classify all "voice traffic" and the transmission component 320 can circulate it into SVLAN_20 542 or SVLAN_40 544, depending upon which segment (e.g., 10.1.1.0/24 or 10.2.1.0/24) a packet is associated, to be routed into VNET_VOICE 562, for example.

It is to be appreciated that that the routing component 550 and the bridging component 120 can reside within the same physical unit or they can reside in different physical units. If, for example, the routing component 550 and the bridging component 120 reside in the same physical unit, the SVLANs can be internal constructs. Alternatively, if the routing component 550 and the bridging component 120 reside in separate physical units, the SVLANs can be externally visible VLANs wherein the SVLANs can share the L2 lookup tables with the native VLANs.

Figure 6:
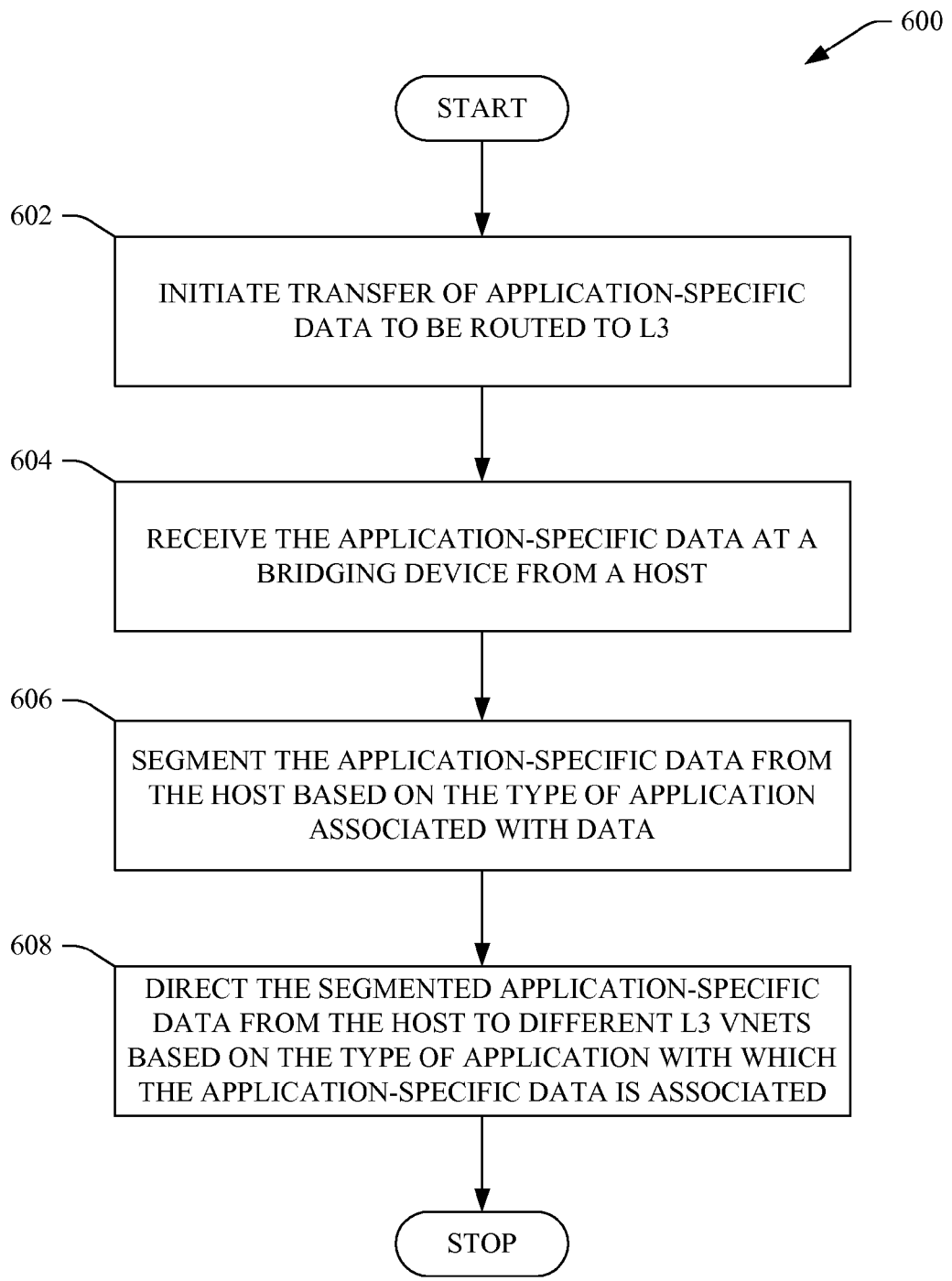
FIG. 6 illustrates a flow chart of an example methodology that facilitates the directing of data based upon the type of application associated with the data in accordance with an embodiment.
Figure 7:
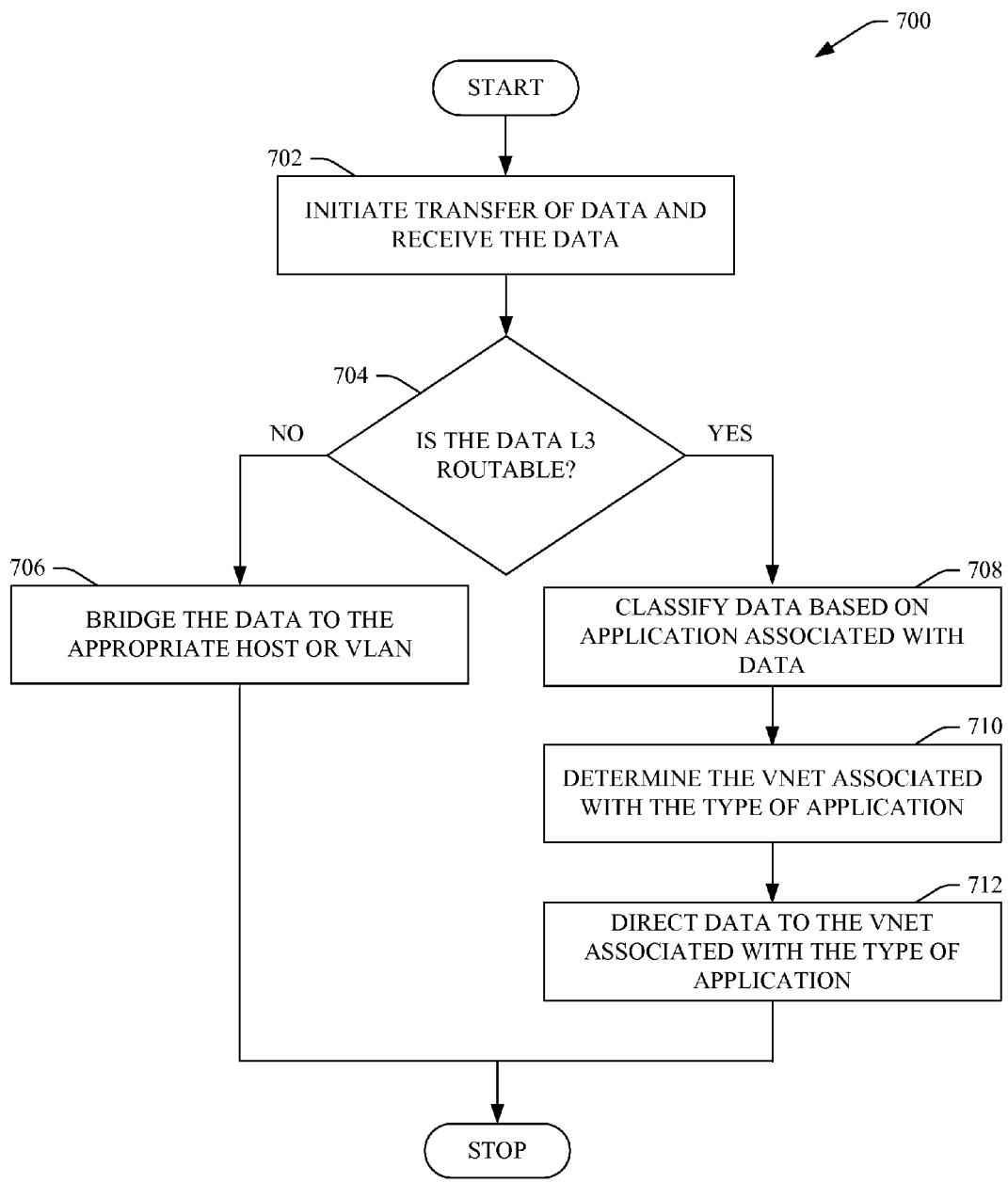
FIG. 7 illustrates a flow chart of an example methodology that facilitates the directing of data based upon the type of application associated with the data in accordance with an embodiment.

FIGS. 6-7 illustrate methodologies in accordance with the subject disclosure. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the specification. In addition, those skilled in the art will understand and appreciate that the methodologies could alternatively be represented as a series of interrelated states via a state diagram or events.

FIG. 6 illustrates an example methodology 600 for classifying and directing application-specific data from a host to a vNET based on the type of application the application-specific data is associated in accordance with the specification. At 602, a data transfer of application-specific data to be routed to L3 can be initiated. For example, a host (e.g., host 102 of FIG. 1) can initiate the transfer of application-specific data to a bridging component (e.g., bridging component 120 of FIG. 1, FIG. 2 etc.) that is to be routed to L3, wherein the L3 application-specific data can be associated with a particular type of application. The application-specific data can be associated with a voice application, FTP application, audio application, peer-to-peer application etc.

At 604, the data can be received. In accordance with one aspect of the disclosed subject matter, a bridging device (e.g., bridging device 120 of FIG. 1, FIG. 2 etc.) can receive the application-specific data from a host (e.g., host 102 of FIG. 1, FIG. 2 etc.). At 606, the application-specific data from a host can be segmented based on the type of application with which the application-specific data is associated. For example, an application classifier component (e.g., application classifier component 130 of FIG. 1) can segment individual host L3 traffic at the L2 level of the network. In accordance with one aspect of the specification, the data can be associated with a File Transfer Protocol (FTP) application. In another aspect, the data can be associated with a voice or audio application. The application classifier component can, for example, associate multiple VLANs with an L2 forwarding table and classify (e.g., segment) traffic at the switch port (e.g., bridging component 120) ahead of bridging into SVLANs that can be associated with different L3 vNETs. In one aspect, the application classifier component can be associated with a single VLAN (e.g., within a physical router port), wherein the application classifier component can classify the data traffic into different vNETs based on the application classification of the data traffic. In another aspect, the application classifier can insert a host's FIB entries via a shared address resolution protocol (ARP) process into the associated application vNETs. At 608, the segmented application-specific data can be directed from the host to an application-specific vNET (or group of multiple vNETs) that has been allocated for the type of application the data is associated. For example, a transmission component (e.g., transmission component 320 of FIG. 3) can facilitate directing/transmitting the application-specific data that the application classifier component segmented. The transmission component can direct/transmit the individual host traffic (e.g., the application-specific traffic) to different vNETs that can provide, for example, specialized services based on the type of application that the data traffic is associated. At this point, methodology 600 can end.

FIG. 7 illustrates a methodology 700 for routing data to a vNET based on data application type in accordance with the specification. At 702, a data transfer can be initiated and the data can be received. For example, a host (e.g., host 102 of FIG. 1) can initiate a data transfer to a bridging component (bridging component 120 of FIG. 1) that can be associated with a VLAN. At 704, it can be determined if the received data is routable. For example, data between two or more hosts on the same segment of a network (e.g., from host 501 and 502 of system 500) would not need to be routed via a L3 device in certain types of network configurations. If it is determined that the data does not need to be routed then, at 706, the data can be bridged to the destination host or VLAN. For example, the data can be general data associated with conventional L2 switching protocols (e.g., ARP and DHCP).

If, at reference number 704, it is determined that the data that the host transfers is a routable packet, then at 708 the data can be classified/segmented based on the type of application the data is associated with. For example, an application classifier component (e.g., application classifier component 130 of FIG. 1) can classify the data based on the type of application with which the data is associated. In accordance with one aspect of the disclosed subject matter, the host can have attached a tag to the data (e.g., the packet that comprise the data or part of the data) to indicate which type of application the data is associated, wherein the application classifier component can read the tag to determine what type of application the data is associated. For example, a host (e.g., host 102 of FIG. 1) can have attached a video tag for data packets associated with video traffic or an audio tag for data packets associated with audio traffic.

At 710, a determination is made to discern which vNET is associated with the type of application the data is associated. In accordance with one aspect of the specification, one L3 vNET can be configured to service real-time applications and another L3 vNET can be configured to service streaming video. The application classifier component can, for example, determine which L3 vNET (e.g., a vNET for real-time applications, a vNET for streaming video) is associated with the data. At 712, the data can be directed to the L3 vNET that is associated with the type of application the data is associated. For example, a transmission component (e.g., transmission component 320 of FIG. 3) can channel/direct the data to an application-specific vNET. At this point, methodology 700 can end.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The specification may be implemented as a method, or apparatus using standard programming and/or engineering techniques to produce software, firmware, hardware, or any combination thereof to control a computer to implement the specification. It should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the specification.

Some portions of the subject disclosure have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the specification, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
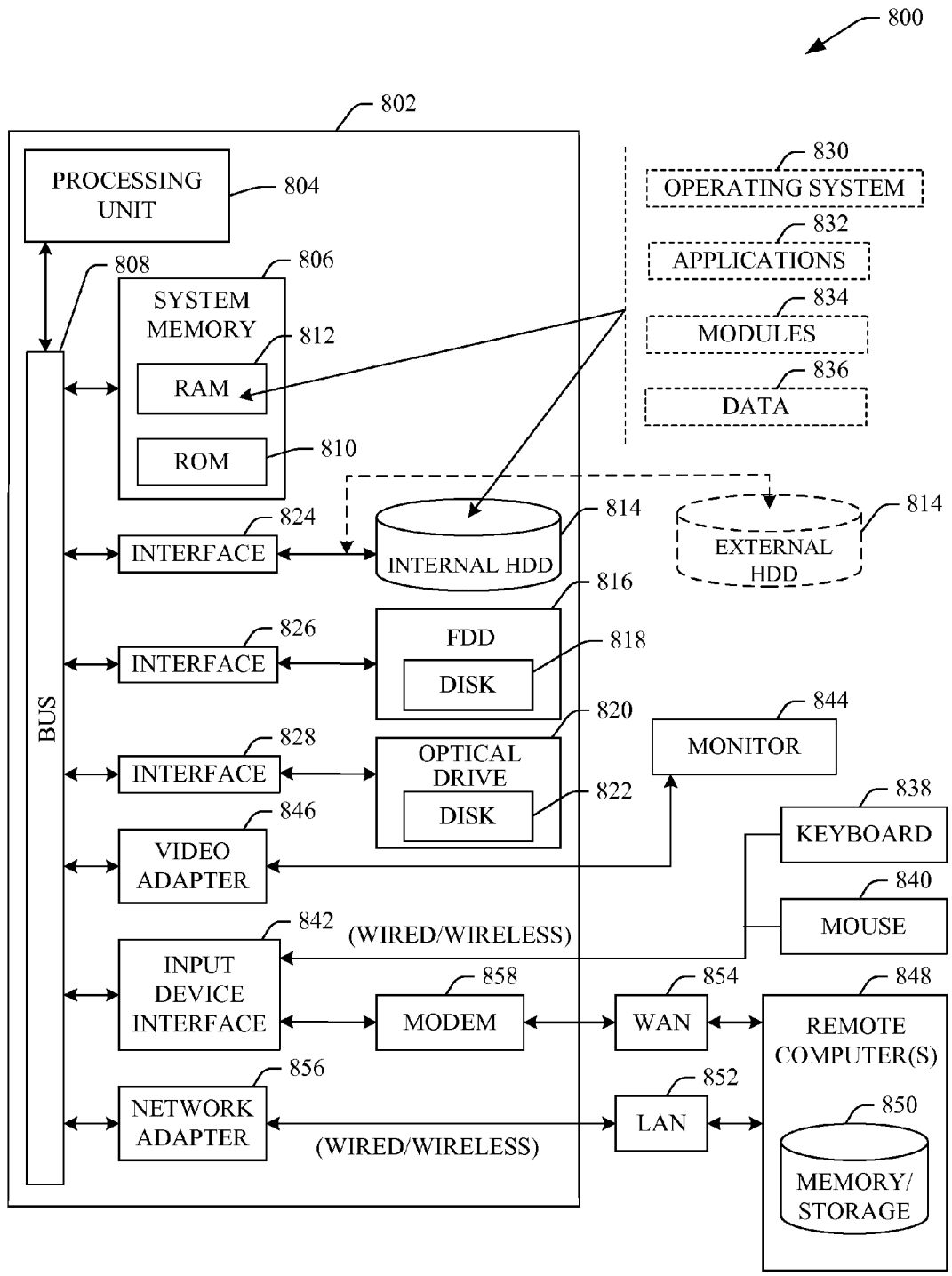
FIG. 8 illustrates a block diagram of a computer operable to execute the disclosed architecture.
Figure 9:
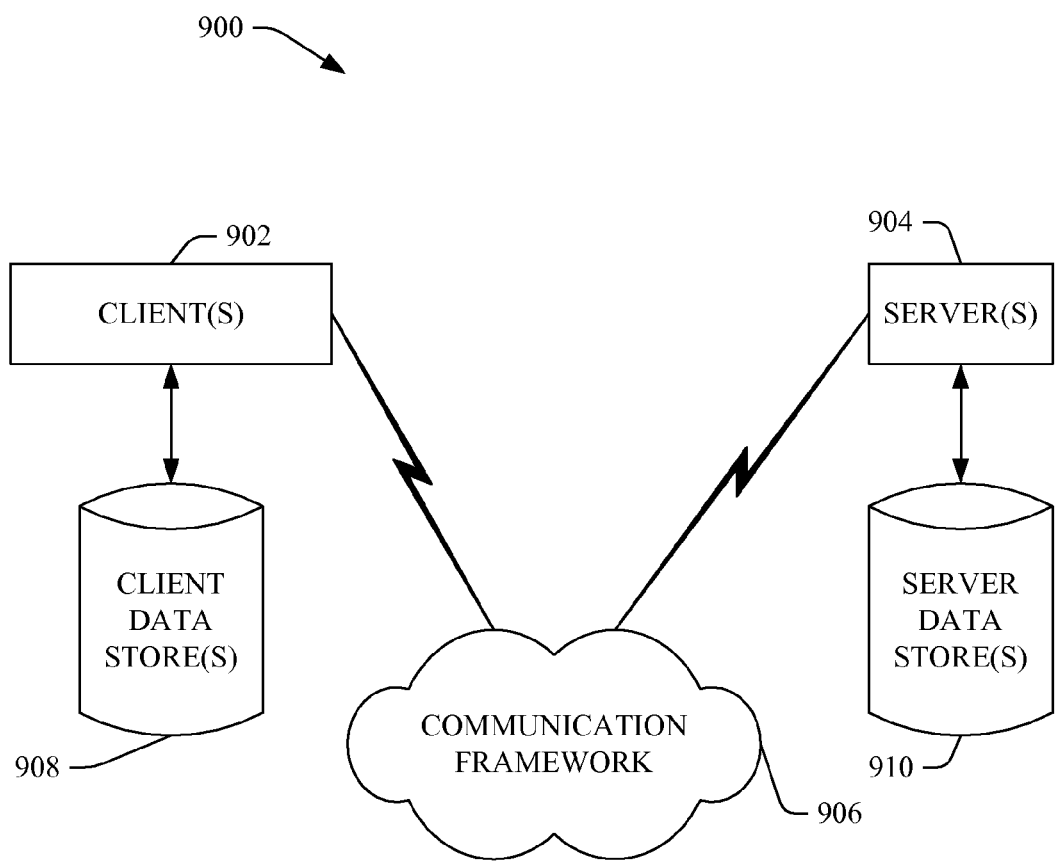
FIG. 9 is a schematic block diagram that illustrates an example of a sample-computing environment in accordance with an aspect of the specification.

In order to provide a context for the various aspects of the specification, FIGS. 8 and 9 as well as the following discussion are intended to provide a brief, general description of a suitable environment in which the various aspects of the specification may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

Referring now to FIG. 8, there is illustrated a block diagram of a computer operable to execute the disclosed architecture. In order to provide additional context for various aspects of specification, FIG. 8 and the following discussion are intended to provide a brief, general description of a suitable computing environment 800 in which the various aspects of the specification can be implemented. While the disclosure has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

System 800 along with its sub-components, for example, can assist the application classifier component (e.g., 130 of FIG. 1, FIG. 3, FIG. 4, and FIG. 5) classify data that a bridging component (e.g., 120 of FIG. 1, FIG. 2, FIG. 3, FIG. 4, and FIG. 5) receives. Further, system 800 can also assist, for example, a transmission component (e.g., 320 of FIG. 3, FIG. 4, and FIG. 5) in computing/executing various switching and/or routing routines that can be associated with directing classified data to a specific VLAN or SVLAN (e.g., 540, 542, 544, 546 of FIG. 5) or a vNET (e.g., 560, 562, 564 of FIG. 5) in accordance with the specification.

With reference again to FIG. 8, the example environment 800 for implementing various aspects of the specification includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system ( e.g., BIOS) is stored in a non-volatile memory 810 such as read-only memory (ROM), erasable ROM (EPROM), electronically EPROM (EEPROM), which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can, for example, store information related to what type of applications the application classifier component (e.g., 310 of FIG. 1, FIG. 3, FIG. 4, and FIG. 5) can associate the unclassified data received from a host (e.g., 501 through 506 of FIG. 5).

The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the specification can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc. The monitor 844, for example, can display information related to how the data of a network is being classified by an application classifier component (e.g., 130 as described in system 100) and to which VLANs (e.g., 440, 442, 442 as described in system 400) and/or vNETs (e.g., 560, 562, 564 of system 500) a transmission component (e.g., 320 of system 300, system 400 and/or system 500) bridges or routes the data.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device, a host (e.g., 102 as described in FIG. 1, FIG. 2, FIG. 4, and FIG. 5), or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are examples and that other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The system 800 also includes one or more server(s) 804. The server(s) 804 can also be hardware and/or software (e.g., threads, processes, computing devices). The servers 804 can house threads to perform transformations by employing the specification, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

FIG. 9 is a schematic block diagram of a sample-computing environment 900 with which the subject specification can interact. The system 900 includes one or more client(s) 902. The clients can have the same or similar functionality as, for example, host(s) 501 through 506 as described in system 500. The client(s) 902 can be hardware and/or software (e.g., threads, processes, computing devices) that transfer unclassified data onto a network, for example. The system 900 also includes one or more server(s) 904, which can have the same or similar functionality as host(s) 501 through 506 of system 500. Further, the server(s) 904 can also have the same or similar functionality as bridging component(s) 120 system 100, system 200, system 300, system 400, and system 500. Also, the server(s) 904) can represent a routing component (e.g., 550 of FIG. 5) within a network. Thus, system 900 can correspond to a two-tier client server model or a multi-tier model (e.g., client, middle tier server, data server), amongst other models. The server(s) 904 can also be hardware and/or software (e.g., threads, processes, computing devices). The server(s) 904 can house threads to perform transformations by employing the subject disclosure, for example. One possible communication between a client 902 and a server 904 may be in the form of a data packet transmitted between two or more computer processes.

The system 900 includes a communication framework 906 that can be employed to facilitate communications between the client(s) 902 and the server(s) 904. Networking VLANs (e.g., 440, 442, and 444 of system 400) and vNETs (e.g., 560, 562, and 564 of system 500) can be associated and reside, in part, within the communication framework 906. The client(s) 902 are operatively connected to one or more client data store(s) 908 that can be employed to store information local to the client(s) 902. Similarly, the server(s) 904 are operatively connected to one or more server data store(s) 910 that can be employed to store information local to the server(s) 904.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What has been described above includes examples of aspects of the subject disclosure. It is, of course, not possible to describe every conceivable combination of components or methodologies for purposes of describing the disclosed subject matter, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   a processor implemented application classifier component that segments routable data traffic prior to bridging layer 2 (L2) data traffic within a shared access virtual local area network (VLAN) and facilitates delivery of the routable data traffic to a plurality of application-specific layer 3 (L3) shadow VLANs (SVLANs),
      wherein the segmentation comprises determining that the routable data traffic is to be delivered to a specific one or more of the application-specific L3 SVLANs, based on an application-specific tag embedded within the routable data traffic by a host that is a member of one or more of the application-specific L3 SVLANs, the tag indicating an application type to which the routable data traffic is associated, wherein the segmentation is performed at an L2 level, and wherein facilitating delivery of the routable data traffic comprises associating the application-specific L3 SVLANs with an L2 forwarding table and bridging the segmented data traffic to the application-specific L3 SVLANs using the L2 forwarding table;
   a plurality of application-specific switched virtual interfaces (SVIs) that associate the application-specific L3 SVLANs to a plurality of application-specific L3 virtual networks (vNETs), wherein the application-specific SVIs are configured to perform L3 processing; and
   a transmission component that delivers the segmented data traffic to one or more of the application-specific L3 vNETs associated with the specific one or more of the application-specific L3 SVLANs, via one or more of the application-specific SVIs associated with the specific one or more of the application-specific L3 SVLANs.

2. The system of claim 1, wherein the application classifier component processes the application-specific tag embedded within the routable data traffic or the application classifier component embeds the application-specific tag into the routable data traffic to facilitate the segmentation of the L2 data traffic prior to bridging the routable data traffic to the plurality of application-specific L3 SVLANs.

3. The system of claim 1, wherein the application classifier component populates interne protocol (IP) addresses from an address resolution protocol (ARP) to a forward information base (FIB) of the more than one of the application-specific L3 vNETs associated with a native VLAN, and wherein the application classifier component cross-populates the IP addresses from the ARP to the FIB of more than one of the application-specific L3 vNETs that correspond to the more than one L3 SVLANs associated with the native VLAN.

4. The system of claim 1, wherein the transmission component employs a distinct IP address for each host associated with the shared access VLAN to transmit the segmented data traffic to the plurality of application-specific L3 vNETs.

5. The system of claim 1, wherein the application type is at least one of a voice application, audio application, video application, file transfer protocol (FTP) application, or peer-to-peer application.

6. The system of claim 1, wherein the application-specific L3 vNETs provide disparate data services based upon an application with which each L3 vNET is associated.

7. The system of claim 1, wherein the application classifier component and the transmission component are physically co-located.

8. The system of claim 1, wherein the application classifier component is implemented within a physical router port.

9. The system of claim 1, wherein the transmission component multicasts the segmented to data traffic from a host to two or more of the application-specific L3 vNETs.

10. The system of claim 1, wherein the transmission component simultaneously delivers the segmented data traffic from a plurality of hosts to two or more of the application-specific L3 vNETs.

11. A method, comprising:
    receiving data traffic from a plurality of hosts;
    at a layer 2 (L2) level, segmenting L2 traffic and layer 3 (L3) traffic from the data traffic prior to bridging L2 data traffic;
    classifying the L3 traffic prior to bridging to a plurality of application-specific L3 shadow virtual local area networks (SVLANs), wherein each SVLAN is associated with a disparate application-specific L3 virtual network (vNET), wherein the classifying comprises determining that the L3 traffic is to be delivered to a specific one or more of the application-specific L3 SVLANs, based on an application-specific tag embedded within the L3 traffic by a host that is a member of one or more of the application-specific L3 SVLANs, wherein the application-specific L3 SVLANs are associated with an L2 forwarding table and the L3 traffic is bridged to the application-specific L3 SVLANs using the L2 forwarding table;
    bridging the L2 traffic via a shared L2 domain;
    associating the application-specific L3 SVLANs to one or more of the disparate application-specific L3 vNETs via a plurality of application-specific switched virtual interfaces (SVIs), wherein the application-specific SVIs are configured to perform L3 processing; and
    routing the L3 traffic to one or more of the disparate application-specific L3 vNETs associated with the specific one or more of the application-specific L3 SVLANs, via one or more of the application-specific SVIs associated with the specific one or more of the application-specific L3 SVLANs.

12. The method of claim 11, further comprising:
populating an internet protocol (IP) address from an address resolution protocol (ARP) to a forward information base (FIB) of the application-specific vNETs associated with a native virtual local area network (VLAN); and
populating the IP address to the FIB of each of the vNETs associated with the native VLAN that correspond to one or more of the plurality of L3 SVLANs.

13. The method of claim 11, further comprising transmitting the data traffic to a plurality of vNETs, wherein the data traffic from a single host can co-exist in a plurality of vNETs.

14. The method of claim 11, further comprising creating a tag associated with the data traffic to facilitate identification of the type of data application with which the data traffic is associated.

15. The method of claim 11, further comprising providing different services based on the application with which the vNET is associated.

16. The method of claim 11, further comprising: bridging the L2 traffic within the shared L2 domain.

17. A system, comprising:
means for receiving data traffic from a plurality of hosts;
at a layer 2 (L2) level, means for segmenting L2 and layer (L3) routable data traffic,
wherein the segmentation occurs prior to bridging L3 routable data traffic to a plurality of application-specific L3 shadow virtual local area networks (SVLANs), wherein the application-specific L3 SVLANs are associated with an L2 forwarding table and the L3 routable data traffic is bridged to the application-specific L3 SVLANs using the L2 forwarding table;
a processor implemented component that classifies the L3 routable data traffic based upon the type of application in which the data traffic is associated, wherein the component determines that the L3 routable data traffic is to be delivered to a specific one or more of the application-specific L3 SVLANs, based on an application-specific tag embedded within the L3 routable data traffic by a host that is a member of one or more of the application-specific L3 SVLANs;
means for delivering the L2 data traffic within a shared L2 domain;
means for bridging the L3 routable data traffic to at least one of the plurality of application-specific L3 SVLANs; and
means for simultaneously transmitting the data traffic to one or more application-specific virtual networks (vNETs) associated with the specific one or more of the application-specific L3 SVLANs, via one or more application-specific switched virtual interfaces (SVIs) associated with the specific one or more of the application-specific L3 SVLANs, wherein the one or more application-specific SVIs are configured to associate the application-specific L3 SVLANs with the one or more application-specific L3 vNETs and to perform L3 processing.

18. The system of claim 1, wherein each of the application-specific SVIs is connected to one of the application-specific L3 SVLANs and one of the application-specific L3 vNETs.

* * * * *